United States Patent
Jiang et al.

(10) Patent No.: US 11,565,408 B2
(45) Date of Patent: Jan. 31, 2023

(54) OBJECT MANIPULATION APPARATUS, HANDLING METHOD, AND PROGRAM PRODUCT

(71) Applicant: KABUSHIKI KAISHA TOSHIBA, Minato-ku (JP)

(72) Inventors: Ping Jiang, Ota (JP); Seiji Tokura, Kawasaki (JP); Yoshiyuki Ishihara, Kawasaki (JP); Akihito Ogawa, Fujisawa (JP); Atsushi Sugahara, Kawasaki (JP); Haruna Eto, Kawasaki (JP); Kazuma Komoda, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 408 days.

(21) Appl. No.: 16/803,536

(22) Filed: Feb. 27, 2020

(65) Prior Publication Data

US 2021/0078170 A1 Mar. 18, 2021

(30) Foreign Application Priority Data

Sep. 18, 2019 (JP) ............................. JP2019-169019

(51) Int. Cl.
*G05B 19/04* (2006.01)
*B25J 9/16* (2006.01)
(Continued)

(52) U.S. Cl.
CPC .............. *B25J 9/163* (2013.01); *B25J 9/1664* (2013.01); *B25J 9/1697* (2013.01);
(Continued)

(58) Field of Classification Search
CPC ........ B25J 9/163; B25J 9/1664; B25J 9/1697; B25J 15/0616; B25J 15/08; B25J 9/0093; B25J 9/161; B25J 9/1612; B65G 47/917; G06N 3/08; G06N 3/008; G06N 3/0454; G06V 20/10; G06V 2201/06; G06V 2201/12; G06V 10/82; G05B 2219/39484; G05B 2219/39505; G05B 2219/39543; G06K 9/6273
See application file for complete search history.

(56) References Cited

U.S. PATENT DOCUMENTS

2018/0250822 A1* 9/2018 Shimodaira ............ B25J 9/1697
2018/0250823 A1* 9/2018 Shimodaira ............ B25J 9/1612
(Continued)

FOREIGN PATENT DOCUMENTS

JP 2018-202550 A 12/2018

*Primary Examiner* — Harry Y Oh
(74) *Attorney, Agent, or Firm* — Oblon, McClelland, Maier & Neustadt, L.L.P.

(57) ABSTRACT

An object manipulation apparatus according to an embodiment of the present disclosure includes a memory and a hardware processor coupled to the memory. The hardware processor is configured to: calculate, based on an image in which one or more objects to be grasped are contained, an evaluation value of a first behavior manner of grasping the one or more objects; generate information representing a second behavior manner based on the image and a plurality of evaluation values of the first behavior manner; and control actuation of grasping the object to be grasped in accordance with the information being generated.

9 Claims, 13 Drawing Sheets

(51) Int. Cl.
*B25J 15/06* (2006.01)
*B65G 47/91* (2006.01)
*B25J 15/08* (2006.01)
*G06V 20/10* (2022.01)

(52) U.S. Cl.
CPC ........... *B25J 15/0616* (2013.01); *B25J 15/08* (2013.01); *B65G 47/917* (2013.01); *G06V 20/10* (2022.01)

(56) References Cited

U.S. PATENT DOCUMENTS

2018/0307936 A1* 10/2018 Kolouri .................. G06N 5/046
2020/0019864 A1* 1/2020 Gu ..................... G05B 19/4183
2020/0096955 A1* 3/2020 Tsuneki ................ G05B 19/19

* cited by examiner

FIG.3

| PICKING TOOL NUMBER | TYPE | ARTICULATION INFORMATION | NUMBER OF SUCTION PADS | SUCTION PAD INFORMATION | NUMBER OF PINCHING FINGERS | INFORMATION ON NUMBER OF PINCHING FINGERS | OUTER SHAPE DIMENSION | CHARACTERISTIC INFORMATION |
|---|---|---|---|---|---|---|---|---|
| TOOL-1 | SUCTION | [ROTATION 1 AXIS] -10 TO 70 DEGREES | 5 | PAD DIAMETER PAD COORDINATE TYPE OF PAD AIR PRESSURE | 0 | NA | 120×120 | PRESENCE OF FORCE SENSOR |
| TOOL-2 | SUCTION | NONE | 1 | PAD DIAMETER PAD COORDINATE TYPE OF PAD AIR PRESSURE | 0 | NA | 35×35 | PRESENCE OF FORCE SENSOR |
| TOOL-3 | SUCTION | NONE | 2 | PAD DIAMETER PAD COORDINATE TYPE OF PAD AIR PRESSURE | 0 | NA | 130×80 | PRESENCE OF FORCE SENSOR |
| TOOL-4 | PINCHING | NONE | 0 | NA | 2 | FINGER OUTER SHAPE DIMENSION OPENING WIDTH INSERTABLE LENGTH PINCHING FORCE | 130×60 | PRESENCE OF FORCE SENSOR |

FIG.9
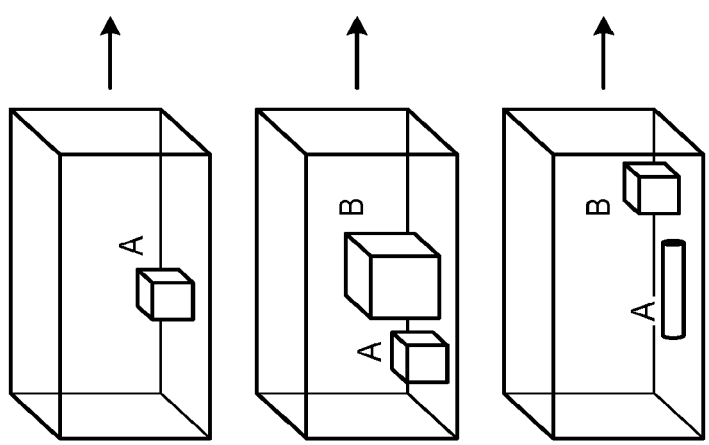

OBJECT MANIPULATION APPARATUS, HANDLING METHOD, AND PROGRAM PRODUCT

CROSS-REFERENCE TO RELATED APPLICATIONS

This application is based upon and claims the benefit of priority from Japanese Patent Application No. 2019-169019, filed on Sep. 18, 2019; the entire contents of which are incorporated herein by reference.

FIELD

Embodiments described herein relate generally to an object manipulation apparatus, a handling method, and a program product.

BACKGROUND

Conventionally, a robot system has been known, which automates an object handling work, such as a picking automation system that handles baggage or the like stacked in a physical distribution warehouse. Such a robot system automatically calculates a grasping position or posture of an object and a boxing position and posture of an input destination based on sensor data, such as image information, and actually executes object grasping or releasing by a robot having a manipulation planning mechanism. In recent years, with the development of a machine learning technology, a technology of realizing appropriate actuation of a robot by learning has been used.

BRIEF DESCRIPTION OF THE DRAWINGS

FIG. 3 is a diagram illustrating an example of picking tool information according to the embodiment;

FIG. 9 is a diagram illustrating an example of a learning data set according to the embodiment;

DETAILED DESCRIPTION

An object manipulation apparatus according to an embodiment of the present disclosure includes a memory and a hardware processor coupled to the memory. The hardware processor is configured to: calculate, based on an image in which one or more objects to be grasped are contained, an evaluation value of a first manipulation approach of grasping the one or more objects; generate information representing a second manipulation approach based on the image and a plurality of evaluation values of the first behavior manner; and control actuation of grasping the object to be grasped in accordance with the information being generated.

Hereinafter, embodiments of an object manipulation apparatus, a handling method, and a program product will be described in detail with reference to the accompanying drawings.

First of all, the outline of an object manipulation system including an object manipulation apparatus (picking robot), which is an example of an object manipulation robot, and a robot integrated management system will be described.

General Outline

Figure 1:
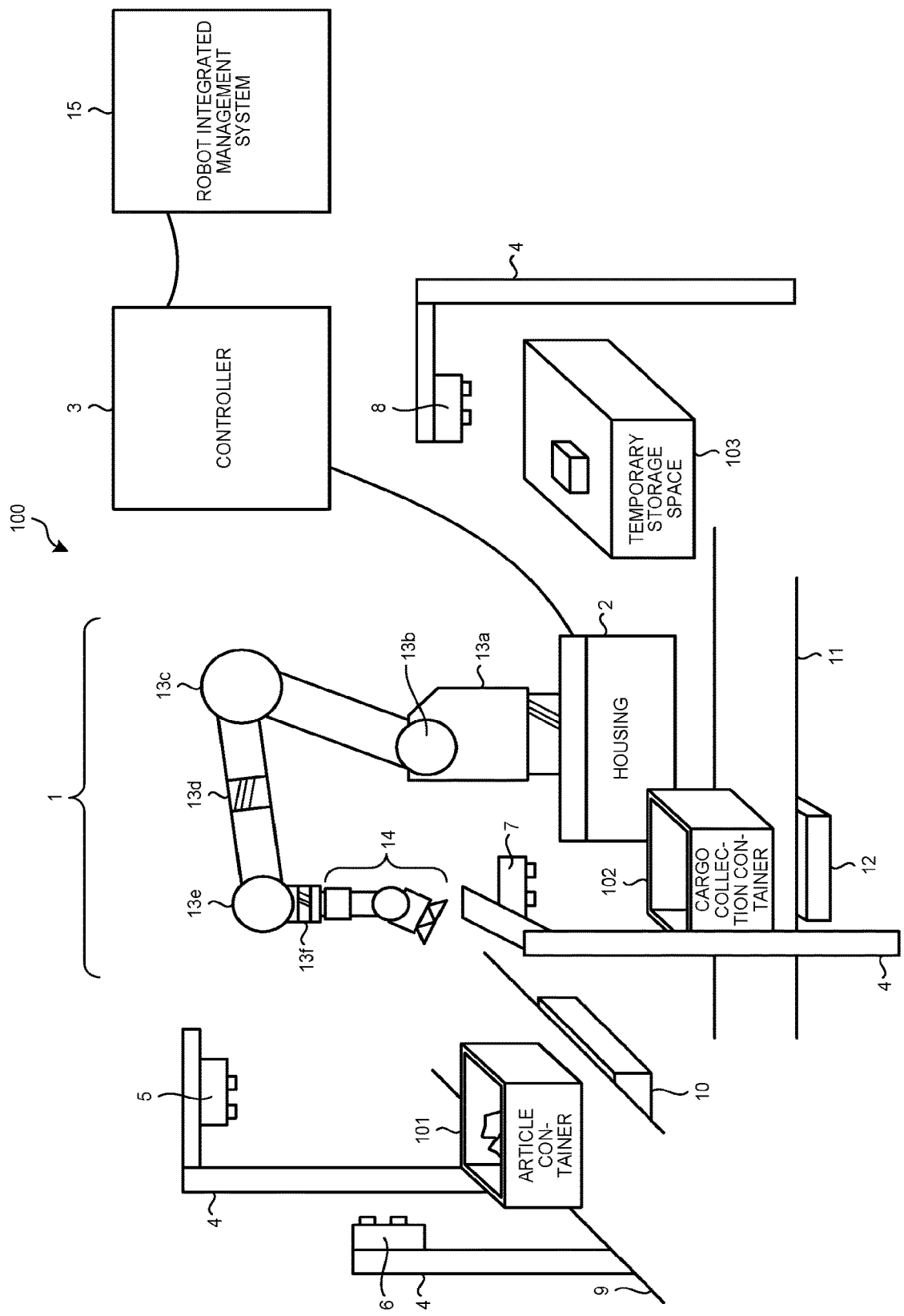
FIG. 1 is a diagram illustrating an example of a configuration of a system for object manipulation task according to an embodiment.

FIG. 1 is a schematic diagram of a configuration of a system for object manipulation task 100 according to an embodiment. The system for object manipulation task 100 according to the embodiment includes an object manipulation apparatus (including a manipulator 1, a housing 2, and a controller 3), a sensor support portion 4, an article container sensor 5, a grasped article measuring sensor 6, a cargo collection container sensor 7, a temporary storage space sensor 8, an article container drawing portion 9, an article container weighing machine 10, a cargo collection container drawing portion 11, and a cargo collection container weighing machine 12.

The sensor support portion 4 supports sensors (the article container sensor 5, the grasped article measuring sensor 6, the cargo collection container sensor 7, and the temporary storage space sensor 8).

The article container sensor 5 measures an internal state of an article container 101. The article container sensor 5 is, for example, an image sensor installed above the article container drawing portion 9.

The grasped article measuring sensor 6 is installed in the vicinity of the article container sensor 5, and measures an object grasped by the manipulator 1.

The cargo collection container sensor 7 measures an internal state of a cargo collection container. The cargo collection container sensor 7 is, for example, an image sensor installed above the cargo collection container drawing portion 11.

The temporary storage space sensor 8 measures an article put on a temporary storage space 103.

The article container drawing portion 9 draws the article container 101 in which target articles to be handled are stored.

The article container weighing machine 10 measures a weight of the article container 101.

The cargo collection container drawing portion 11 draws a cargo collection container 102 that contains articles taken out by the manipulator 1.

The cargo collection container weighing machine 12 measures a weight of the cargo collection container 102.

Note that the article container sensor 5, the grasped article measuring sensor 6, the cargo collection container sensor 7, and the temporary storage space sensor 8 may be arbitrary sensors. For example, sensors capable of acquiring image information, three-dimensional information and the like, such as an RGB image camera, a infra camera, a laser range finder, and a Light Detection and Ranging or Laser Imaging Detection and Ranging (LiDAR) can be used.

Note that, although not illustrated in the schematic diagram of FIG. 1, the system for object manipulation task 100 according to the embodiment includes various sensors, a power supply unit for operating various drive units, a cylinder for storing compressed air, a compressor, a vacuum pump, a controller, an external interface such as a user interface (UI), and a safety mechanism such as a light curtain or a collision detector, in addition to the components described above.

The manipulator 1 includes an arm portion and a picking tool portion 14.

The arm portion is an articulated robot driven by a plurality of servo motors. The articulated robot, whose typical example is a vertical articulated robot of six axes (axes 13a to 13f) as illustrated in FIG. 1, is configured by a combination of a multi-axis vertical articulated robot, a SCARA robot, a linear motion robot and the like.

The picking tool portion 14 is a mechanism that realizes grasping of an object by a suction, jamming, pinching, and multi-finger mechanism.

FIGS. 2A to 2D are diagrams illustrating first to fourth examples of the picking tool portion 14 according to the embodiment, respectively. As illustrated in FIGS. 2A to 2D, as an end effector of the object manipulation apparatus, a drive portion such as bending or rotation or various sensors may be arranged.

Figure 2A:
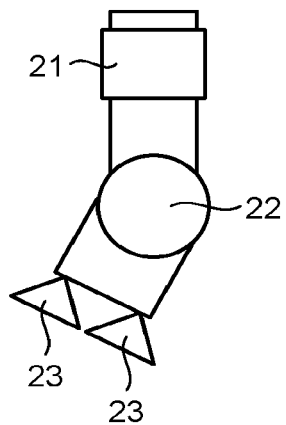
FIG. 2A is a diagram illustrating a first example of a picking tool portion according to the embodiment.
Figure 2B:
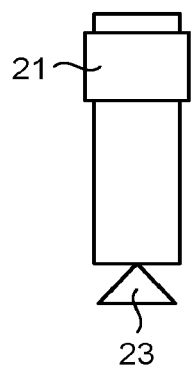
FIG. 2B is a diagram illustrating a second example of a picking tool portion according to the embodiment.
Figure 2C:
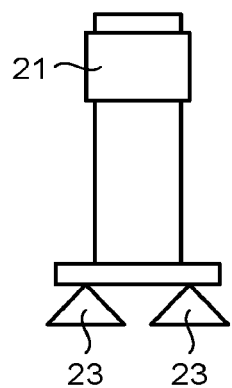
FIG. 2C is a diagram illustrating a third example of a picking tool portion according to the embodiment.
Figure 2D:
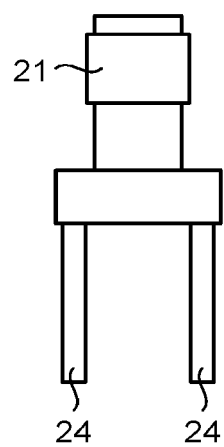
FIG. 2D is a diagram illustrating a fourth example of a picking tool portion according to the embodiment.

In the example of FIG. 2A, the picking tool portion 14 includes a force sensor 21, a bending shaft 22, and suction pads 23. In the examples of FIGS. 2B and 2C, the picking tool portion 14 includes a force sensor 21 and suction pads 23. In the example of FIG. 2D, the picking tool portion 14 includes a force sensor 21 and pinching mechanisms 24.

The picking tool portions 14 are different in the number, a shape, and a position of arranged pads from each other even though they are suction-type picking tool portions, as illustrated in FIGS. 2A to 2C. In addition, the picking tool portion 14 may be a pinching or multi-finger mechanism other than suction-type picking tool portion, as illustrated in FIG. 2D.

FIG. 3 is a diagram illustrating an example of picking tool information according to the embodiment. The picking tool information according to the embodiment includes a picking tool number, a type, articulation information, the number of suction pads, suction pad information, the number of pinching fingers, pinching finger information, outer shape information, and characteristic information.

The picking tool number is a number for identifying the picking tool portion 14. The type represents a type of the picking tool portion 14. The articulation information is information on articulations included in the picking tool portion 14. The number of suction pads is the number of suction pads included in the picking tool portion 14. The suction pad information is information on the suction pads included in the picking tool portion 14. The number of pinching fingers is the number of fingers of the pinching mechanism included in the picking tool portion 14. The pinching finger information is information on the fingers of the pinching mechanism included in the picking tool portion 14. The outer shape information is information representing an outer shape of the picking tool portion 14. The characteristic information is information representing characteristics of the picking tool portion 14.

Returning to FIG. 1, a robot integrated management system 15 is a system that manages the system for object manipulation task 100. The picking tool information in FIG. 3 is stored in a database of the robot integrated management system. The picking tool portion 14 can be attached to and detached from the arm portion by using a picking tool changer. The picking tool portion 14 can be replaced with an arbitrary picking tool portion 14 in accordance with an instruction from the robot integrated management system 15.

Figure 4:
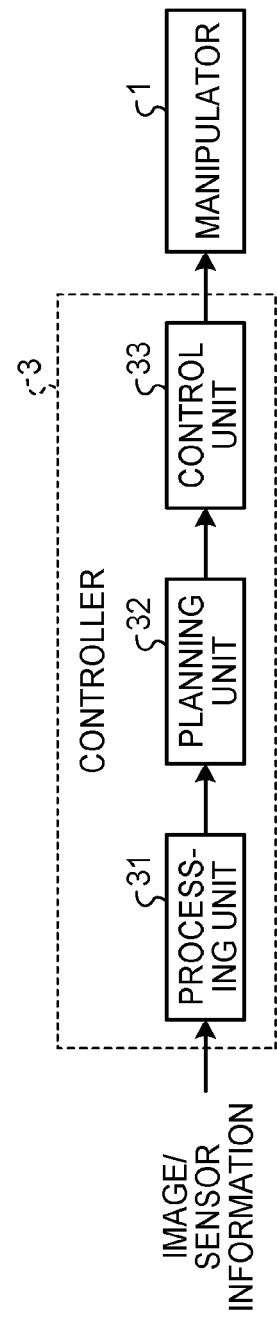
FIG. 4 is a diagram illustrating an example of a functional configuration of a controller according to the embodiment.

FIG. 4 is a diagram illustrating an example of a functional configuration of the controller 3 according to the embodiment. The controller 3 according to the embodiment includes a processing unit 31, a planning unit 32, and a control unit 33.

The processing unit 31 processes images and sensor information acquired by various sensors, and generates an input image such as an RGB-D image input to the planning unit 3.

The planning unit 32 generates information representing a manipulation approach (second manipulation approach) of picking actuation based on the input image input from the processing unit 31. The information of the manipulation approach includes, for example, identification information for identifying a picking tool and a grasping position/pose by the picking tool.

The control unit 33 controls grasp execution that the target object is to be grasped by the object manipulation apparatus including the manipulator 1 in accordance with the manipulation approach (second manipulation approach) generated by the planning unit 32. Specifically, the control unit 33 controls the grasp execution that the target object is based on the grasping position/posture included in the manipulation approach using the picking tool identified by the identification information included in the manipulation approach.

Figure 5:
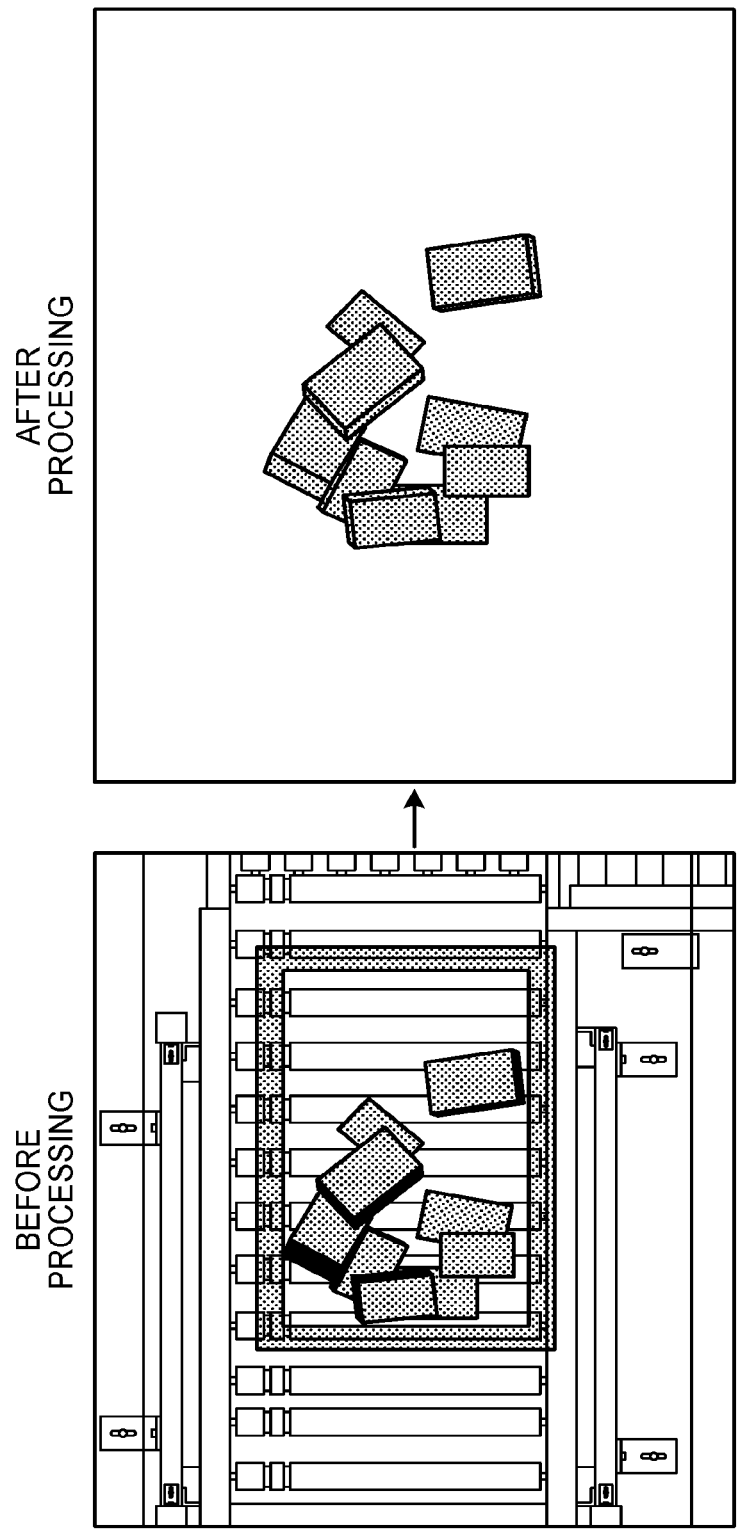
FIG. 5 is a diagram illustrating an example of image processing by a processing unit according to the embodiment.

FIG. 5 is a diagram illustrating an example of image processing by the processing unit 31 according to the embodiment. The processing unit 31 performs processing for converting the image and the sensor information into an image format used by the planning unit 32. For example, the processing unit 31 performs background removal processing, resize processing, and processing for converting an image to one that is captured by a camera with predefined camera intrinsic parameter matrix. The background removal processing is processing for removing an image portion showing a bin receiving a group of objects, a workbench supporting the bin, and a conveyor, from the image. The resize processing is processing of adjusting a size and a scale of the input image input to the planning unit 32. The processing for matching to the camera parameter matrix is processing for regenerating the input image so as to be matched to a camera intrinsic parameter matrix of a camera taking an image used by an evaluating unit 321.

Figure 6:
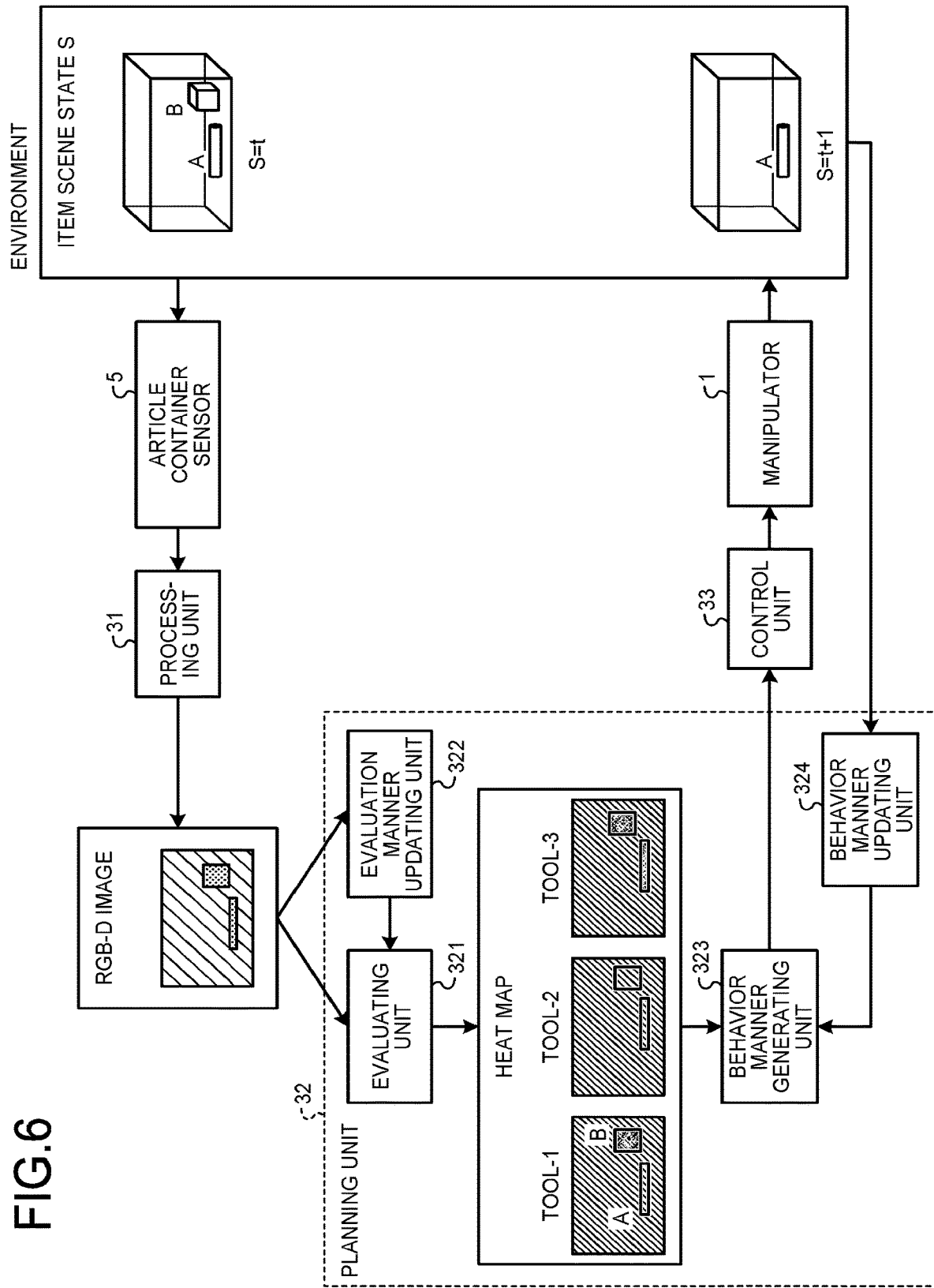
FIG. 6 is a diagram illustrating a functional configuration and an actuation example of a planning unit according to the embodiment.

FIG. 6 is a diagram illustrating a functional configuration and an actuation example of the planning unit 32 according to the embodiment. The planning unit 32 according to the embodiment includes an evaluating unit 321, an evaluation manner updating unit 322, a behavior manner generating unit 323, and a behavior manner updating unit 324.

The processing unit 31 converts an RGB-D image including information on an manipulation scene S of a group of objects to be grasped in the bin (article container 101) into an image format used by the evaluating unit 321, when picking an object at the t-th time.

The evaluating unit 321 calculates an evaluation value of a manipulation approach (first manipulation approach) of grasping the target object based on an image including one or more objects in the manipulation scene. The evaluation value is, for example, a score representing graspability of the object to be grasped. Specifically, the evaluating unit 321 calculates an object area of each object to be grasped and an evaluation value of graspability (heatmap of graspability) of each picking manner (each tool) based on the RGB-D image input from the processing unit 31. In the embodiment, each pixel of the heatmap represents a posture at the time of grasping an object at a position of the world coordinate system for a pixel position and grasping ease (score representing graspability).

The evaluation manner updating unit 322 updates an evaluation manner in order to increase accuracy of the evaluation value. For example, in a case where the evaluating unit 321 calculates the evaluation value using a convolutional neural network (CNN), the evaluation manner updating unit 322 updates the evaluation manner of the evaluation value by updating a parameter of the CNN to minimize the value of a loss function of the CNN.

The manipulation approach generating unit 323 generates a manipulation approach representing a behavior that can acquire a larger accumulative reward with respect to a current manipulation scene based on the above-described RGB-D image and the above-described heatmap. The accumulative reward is, for example, an accumulation of rewards in consideration of at least one of the number of objects that can be picked at the same time, a time taken for picking the object, a success rate of the picking, and the like.

The control unit 33 controls the manipulator 1 in accordance with the behavior manner generated by the planning unit 32.

The behavior manner updating unit 324 updates a parameter that determines the manipulation approach such that a larger accumulative reward can be acquired.

Figure 7:
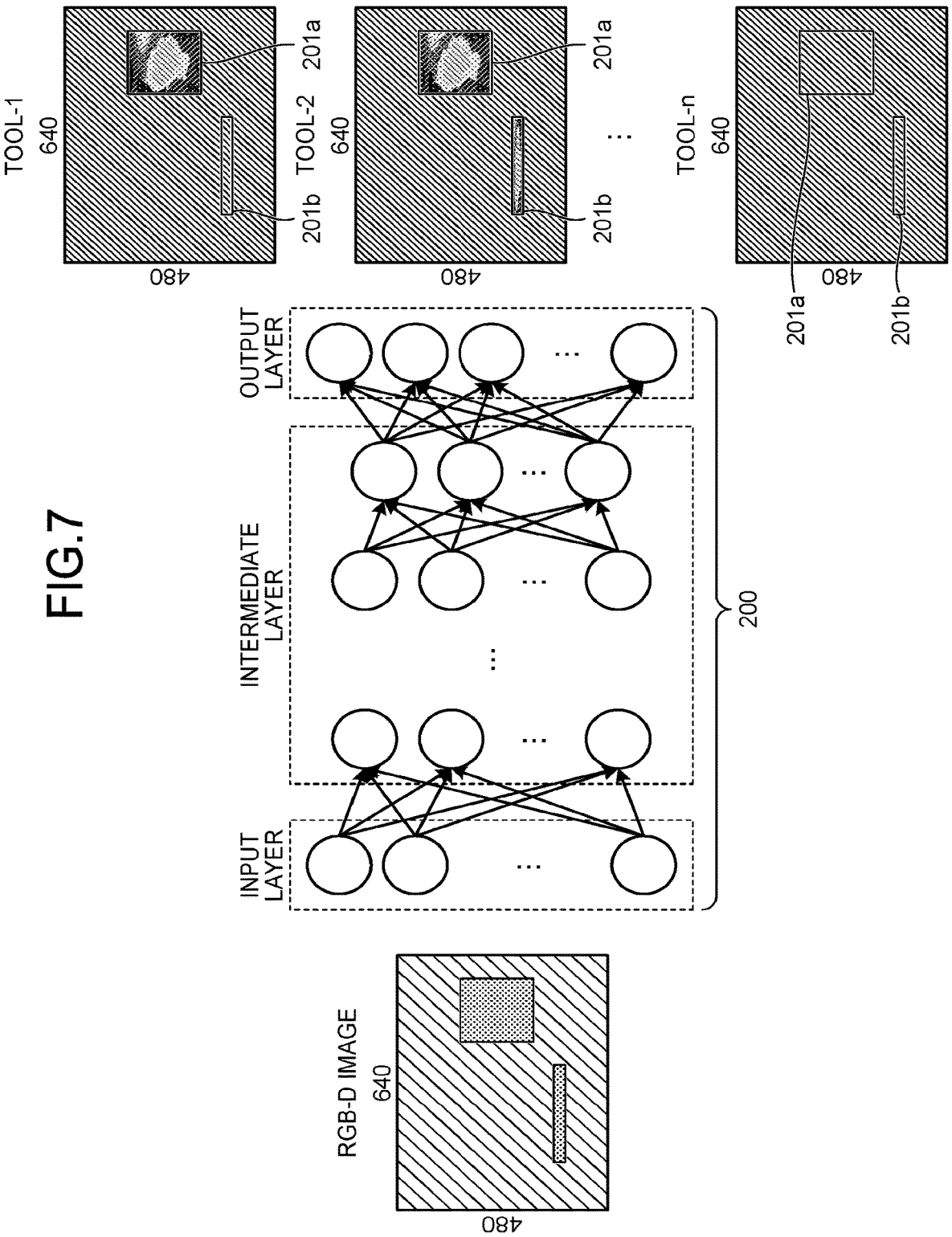
FIG. 7 is a diagram illustrating a processing example of an evaluating unit according to the embodiment.

FIG. 7 is a diagram illustrating a processing example of the evaluating unit 321 according to the embodiment. In the evaluating unit 321, a CNN 200 is used, for example. In the example of FIG. 7, when the evaluating unit 321 receives the RGB-D image (640×480 pixels) from the processing unit 31, the evaluating unit 321 calculates object areas 201a and 201b and heatmaps (evaluation values) of the object areas 201a and 201b for each of a picking tool-1 to a picking tool-n using the CNN 200. Hereinafter, in a case where the object areas 201a and 201b are not distinguished from each other, the object areas 201a and 201b are simply considered as an object area 201.

Each pixel of the heatmap represents a posture (Rot, Rot, Rot) (a row angle, a pitch angle and a yaw angle in the world coordinate system) at the time of picking an object at a position of the world coordinate system corresponding to a pixel position, and graspability. Here, Rot, Rot, and Rot indicate amounts of rotation with respect to XYZ axes of the world coordinate system, respectively. In addition, the graspability is considered in any one or a combination of a robot physical/mechanical restriction, the collision status with a surrounding object, picking safety, and the like.

Figure 8:
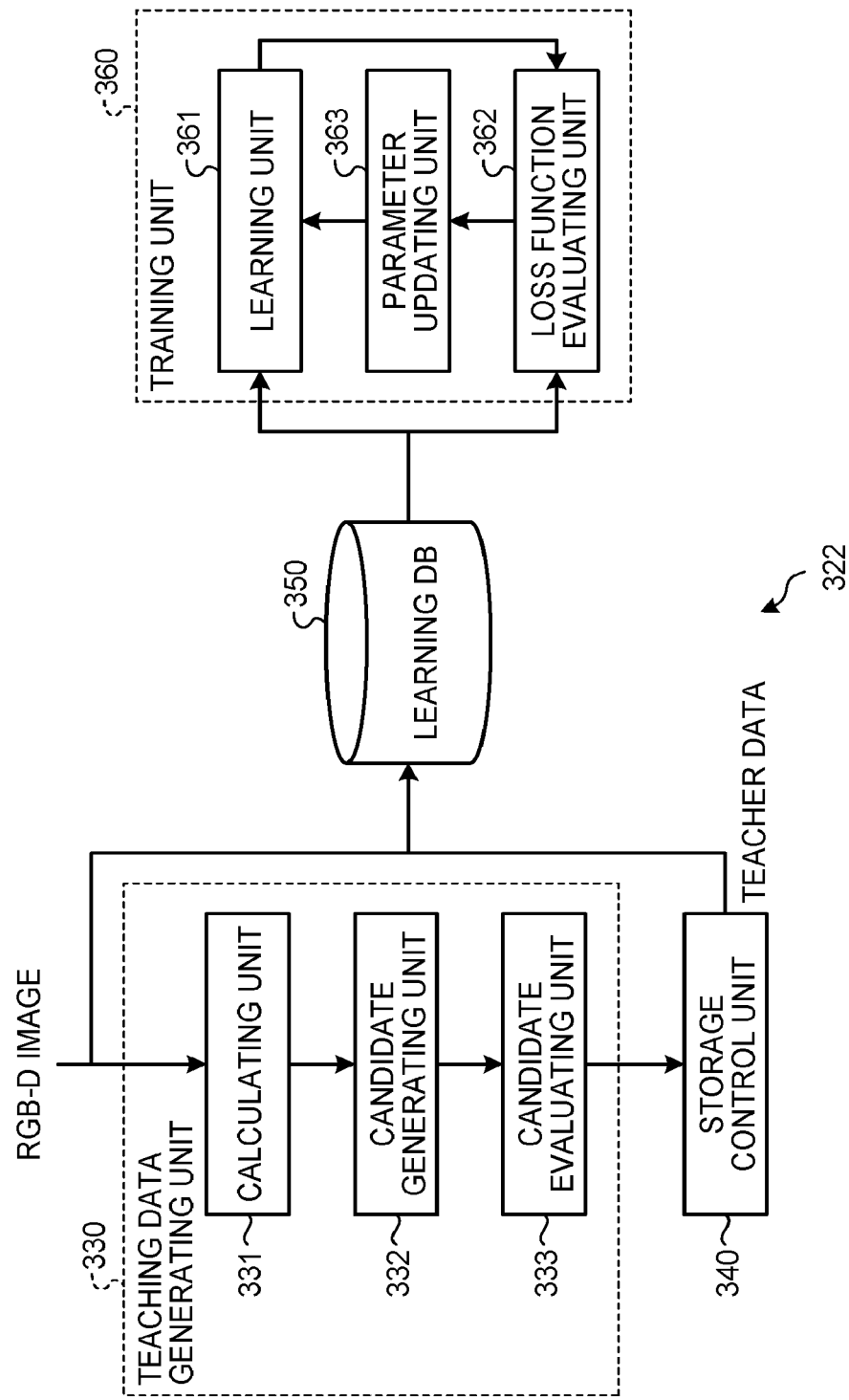
FIG. 8 is a diagram illustrating a functional configuration and an actuation example of an evaluation manner updating unit according to the embodiment.

FIG. 8 is a diagram illustrating a functional configuration and an actuation example of the evaluation manner updating unit 322 according to the embodiment. The evaluation manner updating unit 322 according to the embodiment includes a teaching data generating unit 330, a storage control unit 340, a learning database (DB) 350, and a training unit 360. The teaching data generating unit 330 includes a calculating unit 331, a candidate generating unit 332, and a candidate evaluating unit 333. The training unit 360 includes a learning unit 361, a loss function evaluating unit 362, and a parameter updating unit 363.

At the time of updating the evaluation manner, the calculating unit 331 receives the image information (RGB-D image) from the processing unit 31. The calculating unit 331 calculates the object area 201 from the RGB-D image by using, for example, an image recognition technology. The object area 201 is indicated by, for example, a rectangle or the like. Note that the calculating unit 331 may receive a designation of the object area 201 from a user.

Next, the candidate generating unit 332 samples candidates of a pose for grasping the target object with high graspability which is indicated by the object area 201 calculated by the calculating unit 331 for each pixel of the object area 201. The pose is represented, for example, by the above-described posture (Rot, Rot, Rot) of the world coordinate system.

The candidate evaluating unit 333 calculates a score representing graspability in a case of grasping the object to be grasped by the candidates of the posture sampled by the candidate generating unit 332, for each picking tool. The score of the graspability is calculated by, for example, an performance index (PI in the following Equation (1)) considering probability, stability, and safety of the grasping.

$$PI = w_f F + w_{cp} \tilde{d}_{cp} - w_{env} \tilde{d}_{env} \quad (1)$$

In the Equation (1), a $d_{cp}$ tilde is a normalized distance from a grasping point to the center of a surface including the grasping point. A $d_{env}$ tilde is the normalized nearest distance from the picking tool to a surrounding collision object. The smaller the $d_{cp}$ tilde, the closer to the center of the object, and thus, the higher the stability when grasping. In addition, the larger the $d_{env}$ tilde, the more distant the picking tool from an obstacle such as a wall, and thus, the higher the safety of the grasping.

F is a score of a grasping force at the time of grasping the target object. For example, at the time of sucking a large surface, a plurality of suction pads have a higher suction force (have a higher F score) than that of a single suction pad, and can thus more stably hold the target object. On the other hand, at the time of grasping a surface (for example, an elongated object) smaller than an area that can be sucked by the suction pad, a suction force of the suction pad becomes weak (F score is low). In this case, a two-finger or multi-finger pinching hand has a higher pinching force (higher F score) than that of the suction pad, and can thus more stably pitch the target object.

In a case of grasping the object to be grasped by the pinching, an insertion depth of the pinching tool with respect to the target object pose may be used as an evaluation item, in addition to the evaluation items considering the probability, the stability, and the safety of the grasping. When the object to be grasped is pinched at a deeper position, the target object can be stably grasped.

The storage control unit 340 selects a posture whose evaluation value becomes larger from the candidates of the posture, generates a heatmap representing the selected posture and the evaluation value of the selected posture by each pixel of the object area 201 as teaching data, and stores a learning data set in which the teaching data and the RGB-D image are associated with each other in the learning DB 350 (storage unit).

FIG. 9 is a diagram illustrating an example of a learning data set according to the embodiment. The learning data set according to the embodiment includes an RGB-D image and teaching data. The RGB-D image is obtained by capturing the image of disorganized target objects in a bin. The teaching data is the above-described heatmap calculated for each picking tool.

Returning to FIG. 8, the learning unit 361 calculates the object area 201 and the heatmap by the CNN using the learning data set. Specifically, the learning unit 361 loads the RGB-D image from the learning DB 350, calculates an object area 201 of each object to be grasped included in the RGB-D image and a heatmap representing an evaluation value of graspability of each picking manner (each tool), and inputs the heatmap to the loss function evaluating unit 362.

The loss function evaluating unit 362 reads the teaching data associated with the RGB-D image from the learning DB 350, and receives the heatmap from the learning unit 361. The loss function evaluating unit 362 evaluates an output of the learning unit 361 by using a loss function with respect to the ground truth and the heatmap received from the learning unit 361.

The parameter updating unit 363 updates a parameter of the CNN so that a value of the loss function becomes smaller. The loss function is defined by, for example, the following Equation (2).

$$\text{Loss}=L_{rot}+L_{obj}+L_{graspability} \quad (2)$$

In the Equation (2), $L_{rot}$ is an evaluation item of the posture, $L_{obj}$ is an evaluation item of the object area 201, and $L_{graspability}$ is an evaluation item of the graspability.

Update processing of the evaluation manner may be performed, for example, once a new RGB-D image is input to the planning unit 32. Further, for example, a plurality (large amount) of RGB-D images may be stored in advance in the learning DB 350, and the performance index may be updated using the plurality of RGB-D images.

In addition, for example, at the time of performing normal picking, only storage of the RGB-D image may be performed, and updating processing of an evaluation policy may not be performed. Specifically, the updating processing of the evaluation manner may not be performed at the time of performing the normal picking (at the online time), and may be performed at the offline time. Thus, it is possible to achieve both of improvement of picking efficiency and high-speed processing.

Note that an image used for the updating processing of the evaluation manner is not limited to the above-described RGB-D image, and may be arbitrary. For example, the image used for the updating processing of the evaluation manner may be image data obtained in an actual grasping scene or image data obtained from one in a simulator. In a case of acquiring the image data by the simulator, a disorganized heap of objects is generated by placing a group of object models by random poses in a bin. By randomly putting objects into the bin from a certain distance above the bin, it is possible to generate the physical plausible spatial configuration of disorganized heap of objects.

Figure 10:
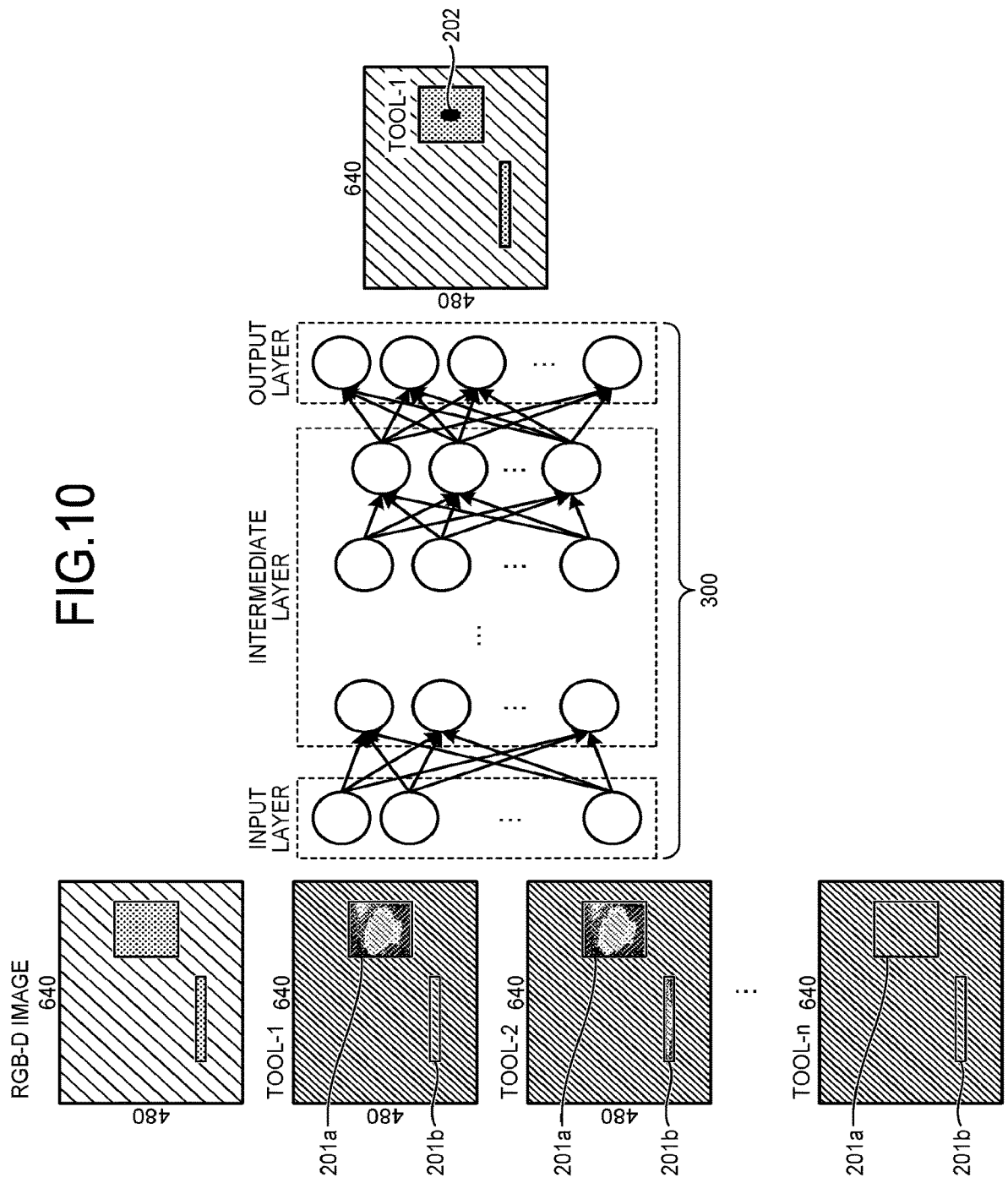
FIG. 10 is a diagram illustrating a processing example of a behavior manner generating unit according to the embodiment.

FIG. 10 is a diagram illustrating a processing example of the manipulation approach generating unit 323 according to the embodiment. The manipulation approach generating unit 323 generates a behavior manner (second behavior manner) based on the image and a plurality of evaluation values of the behavior manner (first behavior manner). Specifically, the manipulation approach generating unit 323 generates a behavior manner of the picking actuation based on the above-mentioned RGB-D image and heatmap. It is preferable that an algorithm used for generating the behavior manner is an algorithm such as reinforcement learning, machine learning, and optimization algorithm capable of evaluating the priority/sequence of a plurality of behaviors and cumulatively evaluating the plurality of behaviors. The example of FIG. 10 illustrates a case of generating an optimal behavior manner using a deep Q-network (DQN) 300. The behavior manner generating unit 323 inputs the RGB-D image and a heatmap of each tool-1 to n to the DQN 300, and outputs a manipulation approach that can acquire a larger accumulative reward. The accumulative reward is, for example, the sum of the numbers of objects to be grasped that can be grasped by a plurality of grasping actuation by generating a behavior by the DQN 300. In the example of FIG. 10, information representing the manipulation approach output from the DQN 300 includes information (tool-1 in FIG. 10) for selecting a tool at the time of grasping the object to be grasped and an area 202 having information on a grasping position and a grasping posture.

Figure 11:
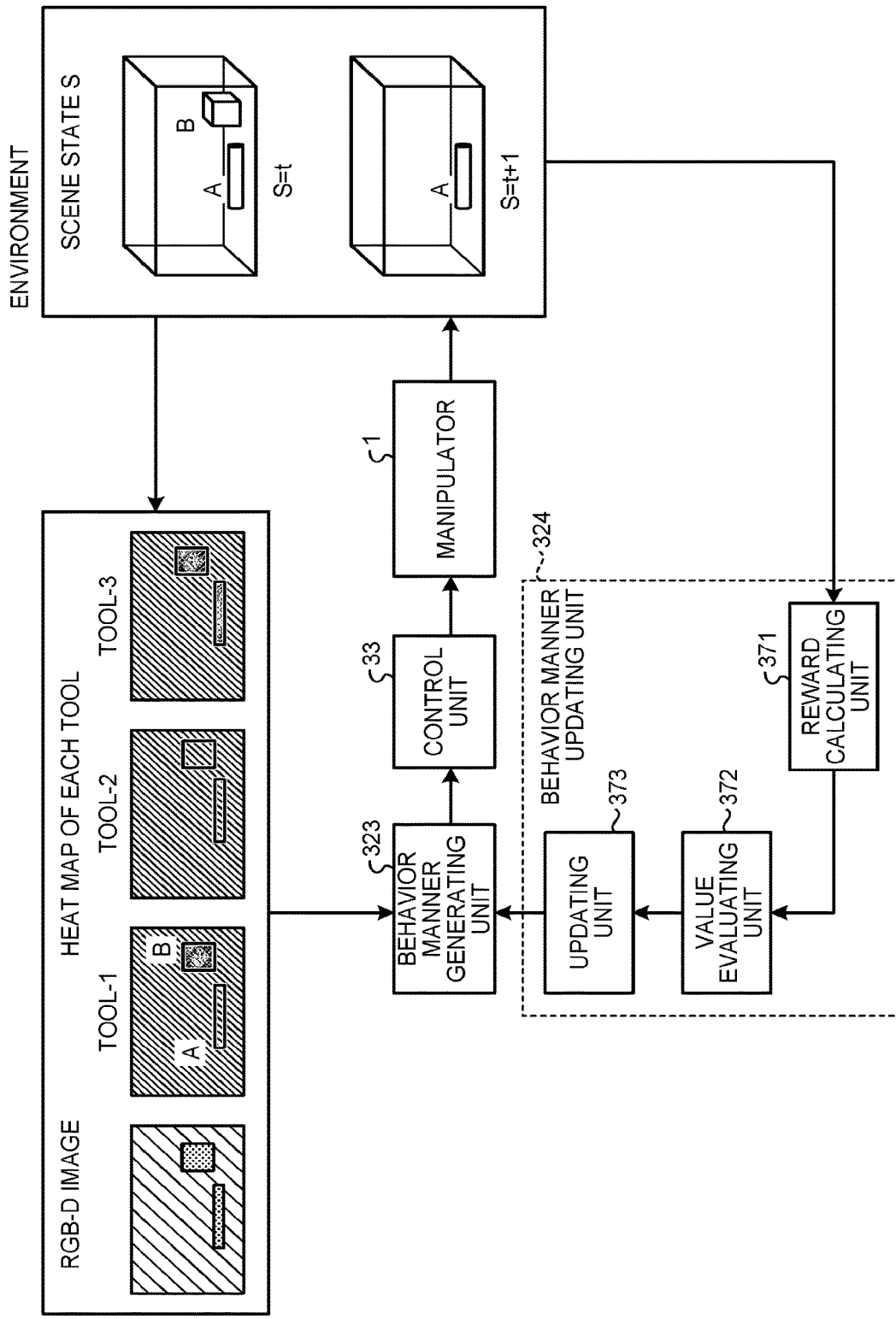
FIG. 11 is a diagram illustrating a functional configuration and an actuation example of a behavior manner updating unit according to the embodiment.

FIG. 11 is a diagram illustrating a functional configuration and an actuation example of the behavior manner updating unit 324 according to the embodiment. The behavior manner updating unit 324 according to the embodiment includes a reward calculating unit 371, a value evaluating unit 372, and an updating unit 373.

Firstly, the behavior manner generating unit 323 generates a behavior policy (second behavior manner) by $\pi_\theta$ (described later) based on a current observation state $y_t$ with respect to a current scene state $S_t$ of the target objects to lead the robot (object manipulation apparatus) including the manipulator 1 to perform grasping actuation.

Next, the reward calculating unit 371 calculates a reward, the value evaluating unit 372 calculates an accumulative reward (value), and the updating unit 373 updates a parameter of the behavior manner that maximizes the value.

Hereinafter, processing of the behavior manner updating unit 324 (the reward calculating unit 371, the value evaluating unit 372, and the updating unit 373) will be described in detail by using Equations (3) to (7) below.

The current scene state $S_t$ (S=t) represents special configuration information (e.g. locations and poses) of the object to be grasped in the bin (article container 101) when the manipulator 1 performs a t-th grasping behavior. The scene information of the target object includes, for example, geometric information such as a shape of the object to be grasped, and a position and a posture of the object to be grasped.

The current observation state $y_t$ is represented by the following Equation (3).

$$y_t=(M_{RBD\text{-}D},M_{H1},M_{H2},\ldots,M_{Hi}) \quad (3)$$

In the Equation (3), $M_{RGB\text{-}D}$ is a matrix of the above-mentioned RGB-D image. $M_{Hi}$ is a matrix of a heatmap of an i-th picking tool.

The behavior manner u is represented by the following Equation (4).

$$u=\pi_\theta(y_t)=(i,Pos,Rot) \quad (4)$$

In the Equation (4), i denotes a tool identification number for identifying a picking tool. Pos is a target grasp position at the time of grasping the target object with the i-th picking tool. Rot is a target orientation at the time of grasping the target object to with the i-th picking tool. $\pi_\theta$ is a behavior manner (considered as the DQN) of the grasping. $\theta$ is a parameter of the DQN.

The reward R is represented by the following Equation (5).

$$R(S_t, \pi_\theta(y_t), S_{t+1}) = \begin{cases} 1, & \text{GRASPING IS SUCCESFUL} \\ 0, & \text{GRASPING IS FAILS} \end{cases} \quad (5)$$

When the grasping action by the behavior manner u is successful, the reward R becomes 1. When the grasping action by the behavior manner u fails, the reward R becomes 0. The success and the failure of the grasping actuation are decided based on, for example, feedback representing success or failure from sensor information of an actual machine or a result of actuation simulation in a simulator.

The behavior manner generating unit 323 generates the behavior manner u by $\pi_\theta$ based on the current observation state $y_t$. The reward calculating unit 371 calculates the reward R. The value evaluating unit 372 calculates an expected value V of an accumulative reward from an initial scene state $S_0$ to the last scene state $S_{T-1}$ by the following Equation (6).

$$V(S_t, \pi_\theta(y_t), S_{t|1}) = E_\theta \left( \sum_{t=0}^{T-1} R(S_t, \pi_\theta(y_t), S_{t|1}) \right) \quad (6)$$

The updating unit 373 updates the manipulation approach (second manipulation approach) by updating the parameter $\theta$ of the DQN using the following Equation (7) as a target function in order to increase the expected value V of the accumulative reward.

$$\theta = \arg\max_{\theta \in \theta} V(S_t, \pi_\theta(y_t), S_{t|1}) \quad (7)$$

In the Equation (7), 0 is a parameter space of the DQN.

Figure 12:
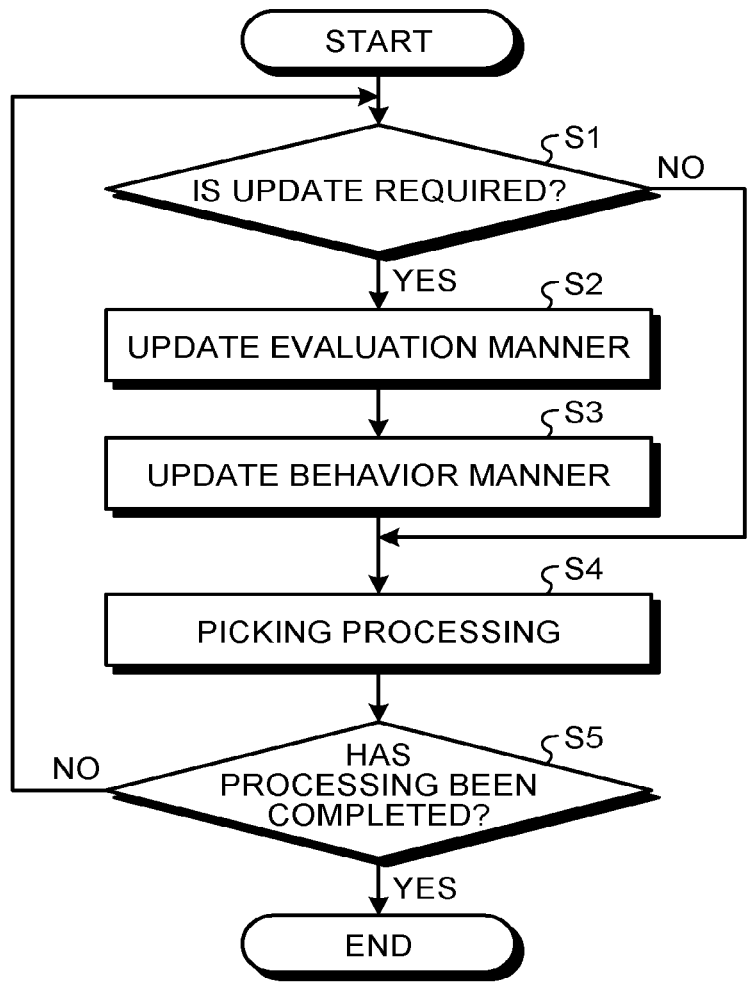
FIG. 12 is a flowchart illustrating an example of a handling method according to the embodiment.

FIG. 12 is a flowchart illustrating an example of a handling method according to the embodiment. Firstly, the planning unit 32 determines whether or not update of the evaluation manner and the behavior manner is required (step S1). A case where the update is required represents, for example, before the object manipulation apparatus (the manipulator 1, the housing 2, and the controller 3) is shipped. The case where the update is required also includes a case where replacement or the like of an intended handling work is performed, a case where performance of a handling work so far is insufficient, and the like.

When the update is required (step S1: Yes), the evaluation manner updating unit 322 updates the evaluation manner (step S2). Specifically, the processing unit 31 converts a format of the RGB-D image obtained from an environment, which is an actual picking site, or an environment constructed by the simulator into a format used by the evaluation manner updating unit 322. The teaching data generating unit 330 generates the above-described teaching data from the RGB-D image, and stores the RGB-D image and the teaching data in the learning DB 350. The learning unit 361 reads the RGB-D image of the learning DB 350, and calculates a position of the object area 201 and the heatmap of the grasping ease of each picking manner by a current behavior manner. The parameter updating unit 363 updates the parameter of the CNN such that the value of the loss function that evaluates a difference between the output of the learning unit 361 and a true value of the teaching data becomes smaller.

Next, the behavior manner updating unit 324 updates the behavior manner (step S3). Specifically, the behavior manner generating unit 323 generates grasping actuation by the current behavior manner with respect to a current item scene state based on the RGB-D image and the heatmap for each picking tool. After the control unit 33 causes a picking device including the manipulator 1 to perform the picking actuation (or after the control unit 33 causes the picking device to perform an actuation simulation in the simulator), the reward calculating unit 371 calculates the reward. The value evaluating unit 372 calculates the expected value of the accumulative reward after generation of the grasping actuation is performed a plurality of times. The updating unit 373 updates the parameter of the behavior manner such that the expected value of the accumulative reward becomes larger.

Next, the control unit 33 generates the grasping actuation in which it seems to be able to acquire a larger accumulative reward by the current behavior manner with respect to the current item scene state based on the RGB-D image and the heatmap for each picking tool to control the picking device including the manipulator 1 (step S4).

The planning unit 32 determines whether or not handling processing has been completed (step S5). In a case where the handling processing has not been completed (step S5: No), processing returns to the processing of step S1, and in a case where the handling processing has been completed (step S5: Yes), processing ends.

As described above, in the object manipulation apparatus (including the manipulator 1, the housing 2, and the controller 3) according to the embodiment, the evaluating unit 321 calculates the evaluation value of the first behavior manner of grasping the object to be grasped based on the image including one or more objects to be grasped. The behavior manner generating unit 323 generates the second behavior manner based on the image and a plurality of evaluation values of the first behavior manner. The control unit 33 controls actuation of grasping the object to be grasped in accordance with the second behavior manner.

Therefore, according to the embodiment, it is possible to efficiently implement the picking work. For example, it is possible to control the grasping actuation while appropriately determining which of a plurality of objects to be grasped is to be first taken and which part of the object to be grasped is to be grasped using which of picking tools.

Modification of Embodiment

Next, a modification of the embodiment will be described. In the above-described embodiment, a case where the behavior is the grasping has been described, but the above-described controller 3 may be applied to actuation such as boxing, in addition to the grasping. For example, at the time of the boxing actuation, the evaluating unit 321 calculates an object area of each object and an evaluation value of boxing easiness (heatmap of boxing ease) of each grasping manner (each tool) based on the RGB-D image. Here, each pixel of the heatmap includes information on a posture and grasping ease at the time of performing boxing at a position of the world coordinate system for a pixel position.

The manipulation approach generating unit 323 generates a behavior manner that can acquire a larger accumulative reward with respect to a current item scene based on the RGB-D image and the heatmap representing the boxing ease of each tool. Here, the larger accumulative reward is a reward that takes into account any one or a combination of the sum of the number of objects that can be boxed in the future, a boxing time, a boxing success rate, and the like. The behavior manner updating unit 324 updates a parameter of the behavior manner such that the larger accumulative reward can be acquired.

Note that the above-described controller 3 may be applied to assembling actuation or the like by evaluating ease of assembling and success and a time of assembling of a plurality of objects, in addition to the grasping and the boxing. In addition, the evaluating unit 321 may perform evaluation by an index that integrates the grasping and the boxing or may perform evaluation using an index that further considers conveyance actuation between the grasping and the boxing.

Finally, an example of a diagram illustrating an example of a hardware configuration of the controller 3 according to the embodiment will be described.

Example of Hardware Configuration

Figure 13:
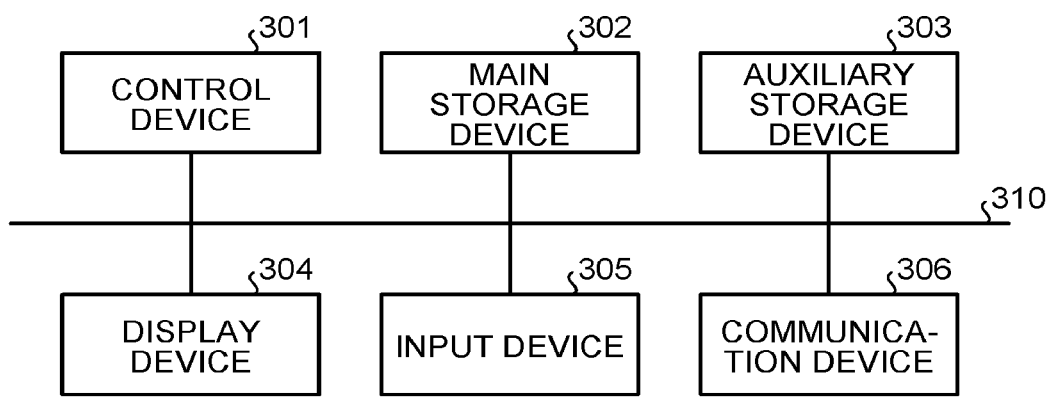
FIG. 13 is a diagram illustrating an example of a hardware configuration of a controller according to the embodiment.

FIG. 13 is a diagram illustrating an example of a hardware configuration of the controller 3 according to the embodiment. The controller 3 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to each other through a bus 310.

Note that the display device 304, the input device 305, and the communication device 306 may not be included. For example, in a case where the controller 3 is connected to another device, a display function, an input function, and a communication function of another device may be used.

The control device 301 executes a program read from the auxiliary storage device 303 to the main storage device 302. The control device 301 is, for example, one or more hardware processors such as a central processing unit (CPU). The main storage device 302 is a memory such as a read only memory (ROM) and a random access memory (RAM). The auxiliary storage device 303 is a memory card, a hard disk drive (HDD), or the like.

The display device 304 displays information. The display device 304 is, for example, a liquid crystal display. The input device 305 receives input of the information. The input device 305 is, for example, a hardware key or the like. Note that the display device 304 and the input device 305 may be a liquid crystal touch panel or the like having both of a display function and an input function. The communication device 306 communicates with another device.

The program executed by the controller 3 is a file having an installable or executable format, and is stored in a computer-readable storage medium such as a compact disc read only memory (CD-ROM), a memory card, a compact disc recordable (CD-R), and a digital versatile disc (DVD) and is provided as a computer program product.

The program executed by the controller 3 may be configured to be stored on a computer connected to a network such as the Internet and be provided by being downloaded via the network. In addition, the program executed by the controller 3 may be configured to be provided via a network such as the Internet without being downloaded.

In addition, the program executed by the controller 3 may be configured to be provided in a state of being incorporated in advance in a ROM or the like.

The program executed by the controller 3 has a module configuration including a function that can be realized by the program among functions of the controller 3.

Functions realized by the program are loaded into the main storage device 302 by reading and executing the program from a storage medium such as the auxiliary storage device 303 by the control device 301. In other words, the functions realized by the program are generated on the main storage device 302.

Note that some of the functions of the controller 3 may be realized by hardware such as an integrated circuit (IC). The IC is, for example, a processor executing dedicated processing.

In addition, in a case where functions are realized using a plurality of processors, each processor may realize one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object manipulation apparatus comprising:
a memory; and
a hardware processor coupled to the memory and configured to:
calculate, based on an image in which one or more objects to be grasped are contained, an evaluation value of a first behavior manner of grasping the one or more objects;
generate, as a second behavior manner, a behavior manner for obtaining an expected value of a larger accumulative reward by using a deep Q-network (DQN) based on a current observation state determined from the image and a plurality of evaluation values of the first behavior manner;
control actuation of grasping the object to be grasped in accordance with the information being generated; and
update the second behavior manner by updating a parameter of the DQN such that the expected value of the accumulative reward becomes larger, wherein the accumulative reward is an accumulation of rewards in consideration of at least one of a number of objects that can be picked at the same time, a time taken for picking, and a success rate of the picking.

2. The apparatus according to claim 1, wherein the hardware processor
calculates, from the image, an object area of the object to be grasped, and
calculates the evaluation value by a score representing grasping easiness of the object to be grasped indicated by the object area.

3. The apparatus according to claim 1, further comprising a sensor configured to acquire the image,
wherein the hardware processor converts an image format of the image acquired by the sensor into an image format used in the calculation of the evaluation value.

4. The apparatus according to claim 1, wherein
the information representing the second behavior manner includes identification information used for identifying a picking tool, and a grasping position/posture by the picking tool, and the hardware processor carries out the control of the actuation of grasping the object to be grasped by using the picking tool identified by the identification information in accordance with the grasping position/posture.

5. The apparatus according to claim 4, wherein the hardware processor calculates the evaluation value by using a convolutional neural network (CNN), and updates an evaluation manner of the evaluation value by updating a parameter of the CNN such that a value of a loss function of the CNN becomes smaller.

6. The apparatus according to claim 5, wherein the hardware processor calculates, from the image, an object area of the object to be grasped from the image, samples candidates of a posture for grasping the object to be grasped indicated by the object area for each pixel of the object area, calculates, for each picking tool, a score representing grasping easiness in the candidates of the posture, selects a posture whose evaluation value becomes larger from the candidates of the posture, generates, as teaching data, a heatmap representing the selected posture and the evaluation value of the selected posture for each pixel of the object area, and stores, in the memory, a learning data set in which the teaching data and the image are associated with each other.

7. The apparatus according to claim 6, wherein the hardware processor calculates the object area and the heatmap by the CNN using the learning data set, and updates the parameter of the CNN such that the value of the loss function of the CNN becomes smaller.

8. A handling method implemented by a computer, the method comprising:

calculating, based on an image in which one or more objects to be grasped are contained, an evaluation value of a first behavior manner of grasping the one or more objects;

generating as a second behavior manner, a behavior manner for obtaining an expected value of a larger accumulative reward by using a deep Q-network (DQN) based on a current observation state determined from the image and a plurality of evaluation values of the first behavior manner;

controlling actuation of grasping the object to be grasped in accordance with the information being generated; and updating the second behavior manner by updating a parameter of the DQN such that the expected value of the accumulative reward becomes larger, wherein the accumulative reward is an accumulation of rewards in consideration of at least one of a number of objects that can be picked at the same time, a time taken for picking, and a success rate of the picking.

9. A computer program product comprising a non-transitory computer-readable recording medium on which an executable program is recorded, the program instructing a computer to:

calculate, based on an image in which one or more objects to be grasped are contained, an evaluation value of a first behavior manner of grasping the one or more objects;

generate, as a second behavior manner, a behavior manner for obtaining an expected value of a larger accumulative reward by using a deep Q-network (DQN) based on a current observation state determined from the image and a plurality of evaluation values of the first behavior manner;

control actuation of grasping the object to be grasped in accordance with the information being generated; and update the second behavior manner by updating a parameter of the DQN such that the expected value of the accumulative reward becomes larger, wherein the accumulative reward is an accumulation of rewards in consideration of at least one of a number of objects that can be picked at the same time, a time taken for picking, and a success rate of the picking.

* * * * *